Oct. 20, 1936.     H. E. LA BOUR     2,058,326
GAS ABSORPTION MACHINE
Filed May 27, 1935     3 Sheets-Sheet 1

Inventor:
Harry E. La Bour.
By
Attys

Oct. 20, 1936.  H. E. LA BOUR  2,058,326
GAS ABSORPTION MACHINE
Filed May 27, 1935   3 Sheets—Sheet 2

Inventor:
Harry E. La Bour.

By Mason, Jackson, Boettcher, Dresser
Attys.

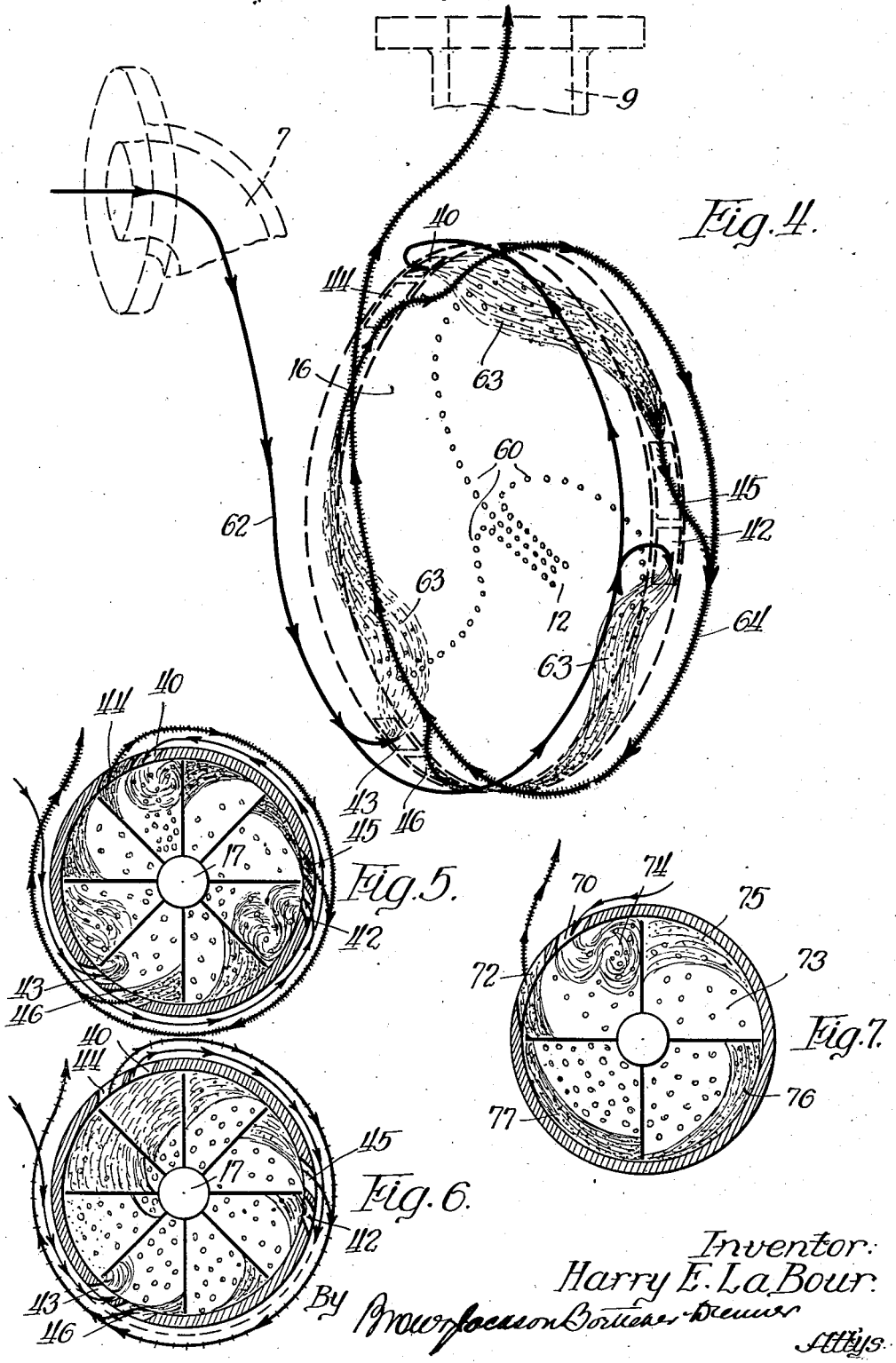

Patented Oct. 20, 1936

2,058,326

UNITED STATES PATENT OFFICE 2,058,326

GAS ABSORPTION MACHINE

Harry E. La Bour, Elkhart, Ind.

Application May 27, 1935, Serial No. 23,698

26 Claims. (Cl. 261—84)

This invention relates to gas absorption machines, and more particularly is directed to machines of this type for producing absorption of gas into a liquid under pressure and delivery of the liquid, with the absorbed gas therein, to any suitable point of use.

It is obviously desirable, in any gas absorption apparatus, to obtain the maximum rate of absorption in the most efficient manner. The rate of absorption, assuming a sufficient amount of gas and absorbing liquid, is in general dependent upon the vapor pressures of the fluids, the intimacy of contact, the temperature and the pressure. The present invention has for a primary object the development of a means for producing maximum efficiency of absorption with minimum expenditure of time and energy.

The phenomenon of absorption may, for a given gas and liquid, be mechanically accelerated in several manners.

First, the acceleration can be provided by control of the intimate contacting of the liquid and the gas. This involves not only the initial breaking up and diffusion of both gas and liquid, but also the continued violent agitation of a mixture or emulsion of the gas and liquid to prevent immunizing of the individual drops or globules of liquid by surface saturation. Necessarily even the absorption of gas by liquid which is initially broken up into a fine spray or minute particles is largely a matter of diffusion.

The present invention provides, as one of its essential functions, an absorption machine attaining an efficient contact between constantly changing particles of liquid and gas, in order to present as much liquid surface as possible to the gas within mechanical limitations of structure. Inasmuch as the phenomenon of absorption of gas in a liquid is controlled by establishment of equilibrium at the gas-liquid interface of the liquid particles, I find that by increasing the rate of diffusion of the more absorptive portion of liquid from the interior of the liquid particle to its interface surface, as by subdividing or shearing the globule of liquid, this equilibrium condition is not reached as rapidly and that by producing a large and constantly changing or diffusing reacting surface, a more rapid absorption is obtained with respect to the rate of travel of the gas and liquid mixture.

Second, the mechanical acceleration of absorption may be produced by pressure. Consequently an ideal absorption machine is one in which an intimate mixture of gas and liquid is obtained having a large and constantly changing reacting surface which is not permitted to stabilize, and at the same time providing for placing of this mixture under suitable pressure.

In the preferred embodiment of my present invention, I provide an absorption machine comprising a casing having therein a substantially cylindrical mixing or churning chamber adapted to receive a multi-bladed paddle or impeller mounted for rotation therein and suitably coupled to any desired substantially constant speed drive. The annular periphery of the chamber is provided with a plurality of ports, at least two in number, although I preferably provide a plurality of pairs of ports spaced substantially equidistantly about the circumference of the impeller chamber. It is to be understood, of course, that the speed is kept constant only for given capacities desired. Variable capacities may be obtained by speed variation, if desired.

The pairs of ports into the impeller chamber are preferably divided, the anterior one, with respect to rotation of the impeller, of each pair of ports being connected to a common discharge manifold for receiving the absorbing liquid with the absorbed gas therein, while the posterior one of each pair of ports is connected to a common inlet manifold. This inlet manifold is adapted to receive absorbing liquid from a suitable source of supply under a substantially constant head, such as a supply tank having its level maintained constant by an overflow weir, a float controlled valve or the like.

The gas is introduced from a suitable gas holder or other supply source at a substantially uniform rate into the center of the impeller chamber from one side thereof, and is churned and intimately commingled with the finely divided inlet absorbing liquid by the churning action of the impeller.

For maximum effectiveness the rate of flow of liquid and the rate of flow of gas in proper proportions should be maintained constant and the mixing action should also be maintained constant. In the present device this action is controlled as nearly as possible by maintaining a substantially constant head of liquid, a substantially constant pressure of gas, and for any desired rate of absorption a substantially constant rate of rotation. But unless there is a definite control of the flow of one of the fluids either in proportion to the other or in some desired relation to their combination or some other phenomenon relating to the desired result, the action of this mechanically mixing and discharging of the fluids tends to be unstable. In the present instance the active mass of liquid is made inherently self regulating. Then at a definite impeller speed the mixing action of the self-regulated body or mass of liquid in the presence of gas at a definite pressure becomes substantially uniform and stable.

The hydraulic balancing principle embodied in this design of absorption machine is of distinct advantage, since the maximum absorption ratio of liquid to gas can be maintained, and the amount of liquid fed into the machine will be controlled by the amount of liquid discharged out of the main discharge throat. Thus, if the amount of liquid being fed to the machine is greater than that required for absorption, the device will produce a throttling action at the intake throats, reducing the amount of intake liquid in accordance with the desired absorption ratio. If not enough liquid is being introduced, the high speed rotating impeller will produce a suction effect on the liquid intake throats, increasing the amount of liquid drawn therethrough into the impeller chamber. The ratio of the liquid to gas to produce maximum absorption is therefore automatically maintained in balance due to the employment of this fundamental principle of operation. Obviously, throttling valves might be employed for the absorbing liquid or gas intake openings under certain conditions, but ordinarily these are not required as the supply of liquid can be controlled in such manner as to produce a preselected desired inlet pressure.

This balance is maintained by the effective centrifugal force produced by the annular ring of absorbing liquid being whirled around the mixing chamber. The radial depth of this liquid remains a substantial constant when the gas absorption machine is working at maximum efficiency, and automatically tends to return to its predetermined extent when varied therefrom. This amount of liquid is controlled first, by the inlet pressure of the incoming fresh absorbing liquid, second, by the rate of rotation of the impeller, which produces the centrifugal force for discharging the mixture of absorbed gas and liquid, and third, by the rate of absorption of gas into the liquid. This third factor, though variable for different gas and liquid mixtures, can be considered practically constant for a given gas and liquid under a substantially constant pressure. The automatic balancing is obtained by reason of the fact that the centrifugal force of the liquid ring will restrict entrance of fresh liquid into the chamber when a flooded condition exists in the chamber. If the excess should be so great that the pressure developed would exceed the inlet pressure some of the liquid may be caused to flow back into the inlet at the same time that it flows out of the discharge. This is not generally necessary or desirable and the machine should be operated so as to avoid it, but it illustrates the high degree of inherent stability of the operation. In the case of a starved condition, the suction effect at the intake ports produced by the high speed impeller without an adequate liquid ring will tend to create an inrush of fresh absorbing liquid until the balanced condition is attained.

The invention therefore has for one of its main objects the provision of absorption apparatus automatically controlling the ratio of absorbing liquid to gas such that the maximum rate of absorption of gas into the liquid is produced.

Another object of the present invention is the provision of means for mechanically accelerating the rate of absorption by maintaining the mixture under pressure and producing a large and constantly changing reacting contact surface between the gas and liquid.

A further object of the invention is the provision of absorption apparatus wherein the amount of absorbing liquid fed thereto is automatically controlled by the quantity of gas-liquid mixture being discharged from the apparatus.

A still further object of the present invention is the provision of a gas absorption machine employing therein fundamental principles of automatic self-balancing operation and control of the gas to liquid ratio.

These and various other objects and advantages of the present invention will appear more fully from the following detailed description, which, taken in conjunction with the accompanying drawings, will disclose to those skilled in the art the particular construction and operation of a preferred form of the present invention.

In the drawings:

Figure 4 is a diagrammatic view illustrating the manner in which the absorption process is carried on within the machine;

Figure 5 is a diagrammatic sectional view through the impeller chamber of a gas absorption machine showing a slightly unbalanced condition of operation;

Figure 6 is a corresponding diagrammatic view showing a condition of operation in which the intake liquid is being forced into the chamber without sufficient absorption of gas; and Figure 7 is a diagrammatic view of a single throat absorption device embodying the principles of the present invention.

Figure 1:
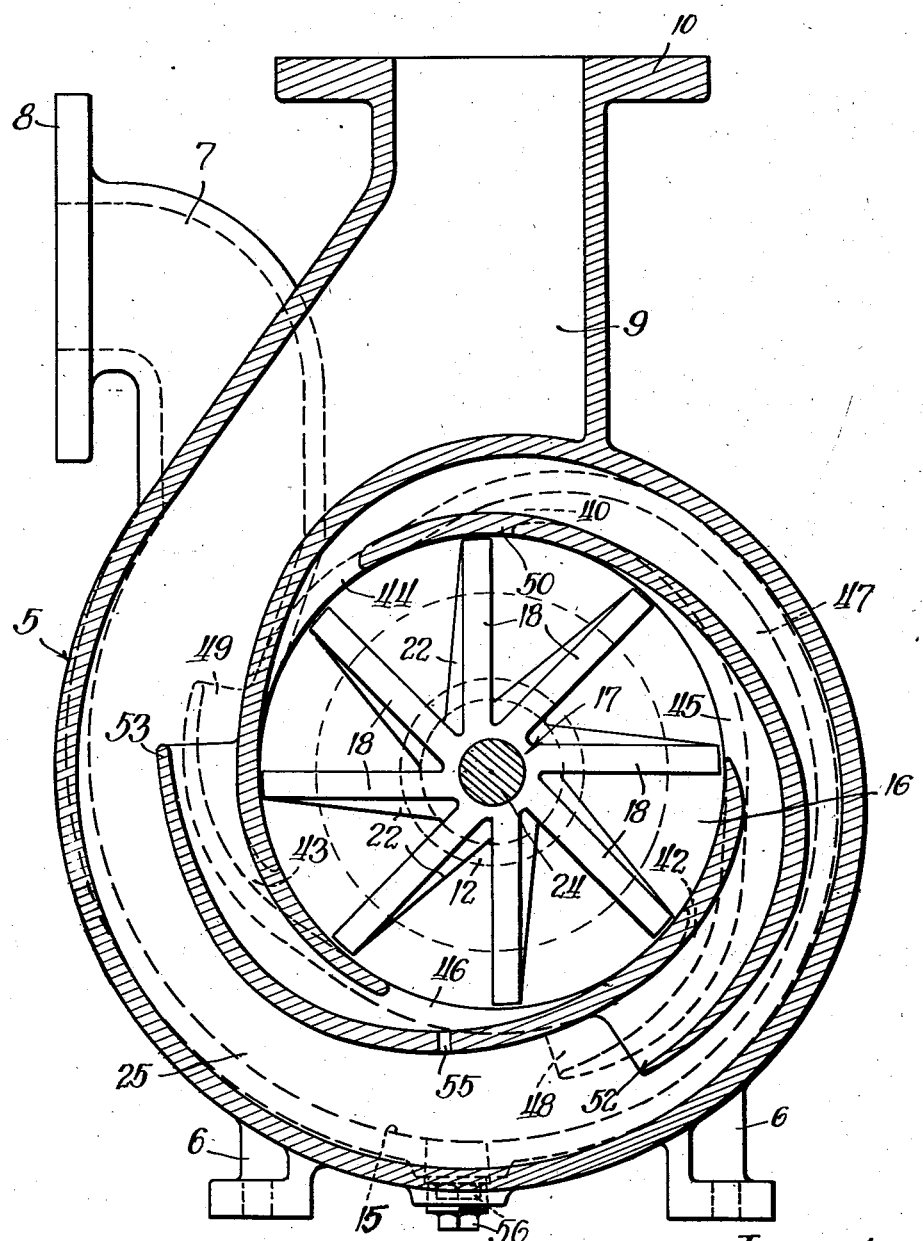
Figure 1 is a vertical sectional view through a gas absorption machine embodying the principles of the present invention.
Figure 2:
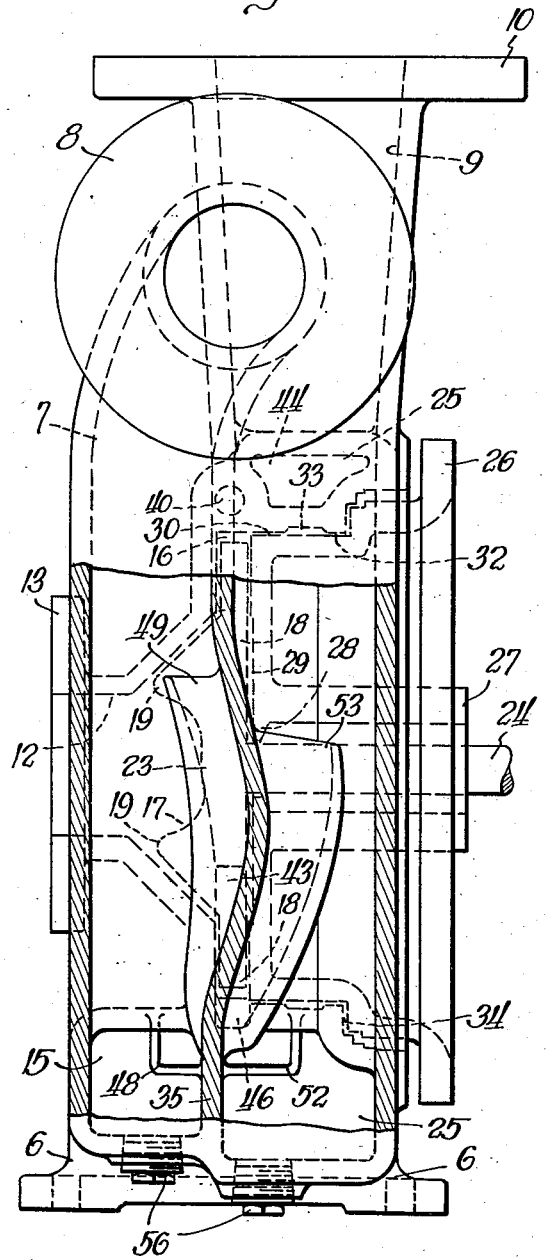
Figure 2 is a side elevational view of the gas absorption machine shown in Figure 1, with a portion of the manifold chamber broken away to show the interior details of construction.

Referring now to the drawings in detail, the gas absorption machine shown in detail in Figures 1 and 2 comprises a housing generally indicated at 5, having integrally cast depending foot portions 6 suitably apertured to receive means for mounting the same upon a supporting base. The housing 5 is provided with a liquid intake port 7 having a flanged opening 8 leading thereto, the flange 8 being secured to any suitable conduit means for conveying the intake liquid to the housing under substantially uniform conditions of pressure and flow. The device is also provided with a discharge chamber shown generally at 9, which terminates in a discharge port defined by the extending annular flange 10, which flange may be suitably apertured for securing a separator to the same, or for securing any suitable discharge conduit means thereto.

The housing 5 is also provided with a central intake 12 having a flange 13 defining the inlet opening thereto, which may be connected to any suitable source of gas supply.

Figure 3:
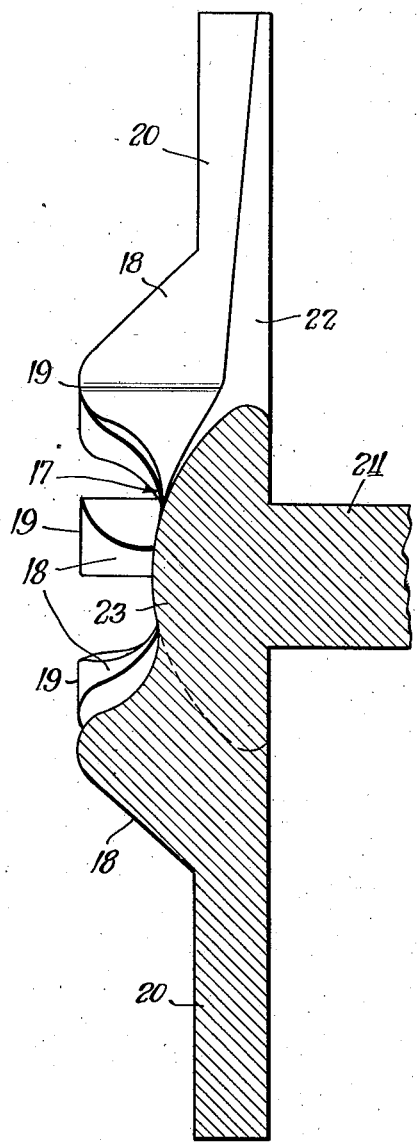
Figure 3 is a sectional view through the impeller employed in the gas absorption machine.

The liquid intake port 7 is connected to a substantially annular manifold shown more or less diagrammatically in Figure 2 by the reference numeral 15, which manifold extends substantially annularly around and at one side of the impeller chamber 16 within which is located the impeller shown generally in Figure 3 at 17. The impeller 17 is provided with a plurality of radially extending blade members 18, formed integrally therewith, the blade members 18 having suitably raised axially projecting vane portions 19 adjacent the center of the impeller to assist in producing turbulence in the incoming gas stream entering through the central opening 12 of the machine. The blades extend outwardly, being reduced in section as shown at 20, and being provided, at the trailing edge thereof, with reinforced rib portions 22, as shown in Figure 3. The blades 18 are all joined to a central hub portion 23, which is provided with an impeller shaft 24 extending outwardly of the housing 5 and suitably coupled, at its extending end, to a motor or other suitable source of driving power.

The discharge port 9 is connected to the impeller chamber through a substantially annular manifold portion indicated at 25, which extends about a recessed portion of the housing 5 into which extends a suitable back plate 26, which back plate forms, at its central portion, a cylindrical bore 27 receiving the shaft 24 and providing bearing support for the shaft at 28, adjacent the hub 23 of the shaft. The plate 26 is slightly recessed, as shown at 29, away from the rear of the impeller blade 18 to provide a slight communicating space therebetween. The plate 26 forms the back or rear wall of the impeller chamber 16, and is suitably machined, as at 30 and 32, to bear against the inner annular defining surface of the manifold 25, there preferably being packing disposed in the recess 33 formed therebetween. Suitable cooperating shoulders are formed in the internal annular wall of the manifold 25 and the back plate 26, as indicated at 34, for receiving gasket means to seal the impeller chamber against leakage outwardly along the external surface of the plate 26, and the plate 26 may be secured to the housing in any suitable manner, such as by a plurality of stud bolts or the like extending about its peripheral flanged edge and engaging the casing 5.

The manifolds 15 and 25 are separated by a substantially radially extending partition wall 35, which wall is curved through certain portions thereof to provide cooperating inlet and outlet openings on opposite sides thereof from the manifolds to the impeller chamber. The wall provides positive separation of the manifold 15 from the manifold 25 except through the ports opening into the impeller chamber.
The impeller chamber 16 is provided, at spaced intervals about its periphery, with intake and discharge ports, the intake ports being respectively indicated at 40, 42 and 43, while the discharge ports are respectively indicated at 44, 45 and 46.
While I have shown, as a preferred embodiment of my invention, three such intake and three discharge ports, it is evident that the invention does not need to be limited to a triple-throat centrifugal type of machine, but may employ either a single throat or any desired number of throats. The intake throats 40, 42 and 43 are connected by suitably outwardly curved rib or flange portions 47, 48 and 49 to outlet ports opening into the intake manifold 15 connected to the intake port 7 on the intake side of the partition wall 35.

In a similar manner, the discharge ports 44, 45 and 46 are connected through suitable outwardly flared flanges 50, 52 and 53 formed integrally with the wall 35 and opening into the discharge manifold 25. These scoop-shaped outwardly flaring flanged passageways are formed integral with the central partition wall 35 between the manifolds 15 and 25, and extend on opposite sides thereof, the scoops 47, 48 and 49 providing suitable means for entrance of the intake liquid from the port 7 and manifold 15 therethrough to the intake ports 40, 42 and 43, respectively.

Similarly, the discharge ports 44, 45 and 46 are adapted to provide for discharge of liquid from the chamber 16 outwardly through the flanges forming the scoops or passageways 50, 52 and 53, into the outlet or discharge manifold 25 leading to the discharge chamber 9 of the unit.
The scoop 53, as noted in connection with Figure 1, is provided with a drain opening 55 for the purpose of draining liquid from the pump during shipment or storing. Further, at the lower portion of each of the manifolds 15 and 25 suitable drain plugs 56 are provided for draining liquid from these manifolds at the lowermost point thereof.

The impeller 17 is adapted to rotate in a clockwise direction within the impeller chamber 16, when viewed in the position shown in Figure 1, and the blades 18 thereof consequently move across the ports 40, 42, 43, 44, 45 and 46 in the direction of outflow of the ports. In the case of the ports 44, 45 and 46, this movement is effective to produce discharge of liquid out of these ports. However, with respect to ports 40, 42 and 43, the intake liquid entering through these ports under a relatively low static pressure is hit by the tip ends of the impeller blades 18 and is broken up or divided into a plurality of fine particles or spray driven into the space between the respective blades of the impeller. At the same time, the axially extending projections 19 of the blades 18 provide for scooping in of gas through the gas intake opening 12, which gas is forced, by centrifugal action, outwardly between the blades 18 into contact with the liquid particles in the impeller chamber 16. The gas is preferably under a low static pressure.
The impeller of the present invention is, in one preferred form of the invention, driven at a speed of from 1750 to 1800 R. P. M., depending upon the type of motor employed as a driving force, and consequently the peripheral speed of the tip end of the blade 18 is such that the liquid entering the inlet ports 40, 42 and 43 is practically instantaneously split into an infinite number of fine spray particles or the like.

Considering now Figure 4, the particular absorption process carried on within the unit 5 is disclosed in detail. In this somewhat diagrammatic view, the impeller chamber 16 is shown with the ports 40, 42, 43, 44, 45 and 46 indicated in their respective positions about the annular periphery thereof. The gas being forced into the impeller chamber through the opening 12 is indicated by the substantially round bubble members shown at 60, which pass from the center of the impeller chamber outwardly along the blades by reason of the centrifugal force due to rotation of the impeller, and also due to the suction produced by the movement of these blades within the impeller chamber. At the same time, intake liquid, indicated by the solid line provided with arrows and shown by reference numeral 62, moves into the intake manifold 15 from the intake port 7, and enters the interior of the impeller chamber 16 through the ports 40, 42 and 43.

The intake liquid is usually under a low static pressure, and as it moves into the interior of the impeller chamber it is struck by the rapidly moving tip ends of the impeller blades, and broken up and sprayed into the space between the blades as an infinite number of relatively small particles of liquid. At the same time the air particles 60 are passing across the ports 40, 42 and 43, being carried thereacross by the blade members 18. As a consequence, a turbulent and rapidly changing interface contact between the gas particles and liquid particles is effected immediately beyond the ports 40, 42 and 43 between the adjacent blade members as they move about the impeller chamber. These sections of turbulent intermixture between the gas and liquid are indicated at 63 in Figure 4.

At the same time that this interface contact is being effected between the gas and liquid particles, a portion of the liquid which has been struck by the impeller tip and sprayed downwardly toward the hub of the impeller begins to move outwardly by reason of its weight and due to the centrifugal force of rotation imparted by the rotation of the impeller. As a result, this liquid tends to move toward the outer annular defining surface of the impeller chamber, squeezing some of the unabsorbed air particles therethrough, since they are of less mass than the liquid particles. At the same time the movement of liquid outwardly imposes a pressure upon the confined gas particles within the liquid that is being turbulently stirred and agitated during this travel of the impeller blade from one of the intake ports to the next succeeding discharge port. By the time the liquid has reached the discharge port next contacted in its path of movement around the impeller chamber considerable absorption of gas into the liquid has occurred, due, first, to the breaking up of the liquid into a substantially infinite number of minute particles by reason of it being hit by the tip of the impeller and splashed or sprayed over the space between the adjacent impeller blades, thereby entrapping and contacting the gas particles within this space, and secondly, due to the pressure produced by the centrifugal movement of the liquid outwardly toward the annular periphery of the impeller chamber.

The agitation produced within the impeller chamber during rapid rotation of the impeller produces a substantially frothy or white water mixture therein, which is constantly changing in surface and size of the individual particles. The individual particles themselves are also continually changing their surface, being either agglomerated together or sheared or subdivided further to present new surfaces to the gas particles in contact therewith. As a result, intimate interface contact between all portions of liquid and gas is obtained, and absorption is thereby accelerated. As the blades pass the discharge port, the centrifugal weight of the liquid carrying absorbed gas therein, together with the fact that there is no resisting pressure at the discharge port, causes the discharge of this liquid outwardly through the ports 44, 45 and 46 into the discharge manifold 25. The liquid with the absorbed gas therein is shown by the arrows generally indicated at 64, which are then forced under pressure through the discharge manifold 25 to the discharge chamber 9 of the absorption machine. Since the liquid always possesses greater mass than the gas particles, it is apparent that substantially all of the liquid will be discharged through the discharge ports before any discharge of free gas occurs.

Also, due to the fact that centrifugal force will cause the major portion of the liquid to pass through any entrapped agglomerated gas bubbles which have not been absorbed into the liquid it is apparent that no considerable quantity of entrained unabsorbed bubbles will be carried into the discharge ports. This insures that maximum efficiency of absorption will be attained within the impeller chamber, and consequently the discharged liquid will not contain any great quantity of entrained unabsorbed gas bubbles. Even if inert gases are present, which are not absorbed but must be carried through the liquid, these gases can be removed by passing the discharge liquid into a separating chamber or the like. Also, it is obvious that the entrained gas which may pass outwardly to the discharge manifold may be removed in any well known manner, as desired.

The operation of the present gas absorption machine is based upon a hydraulic self-balancing principle. The machine, when started, produces a suction at the intake, which suction is sufficient to allow for inflow of gas through the inlet port 12 into the space between the impeller blades in the impeller chamber. The separate liquid intake ports are connected to the constant low pressure supply source, and consequently when the device is started there will be a suction produced at the gas inlet, and the liquid inlet ports being under a low static pressure, the incoming liquid passing through the intake or bypass throats will be sprayed into the entrapped gas, absorbing a portion thereof and being then forced outwardly through the discharge throats.

This provides for maintaining a substantially constant gas to liquid ratio in the mixing chamber. Thus, when the liquid passing into the intake throats 40, 42 and 43 is insufficient to absorb all of the gas being forced into the chamber, the discharge of gas outwardly through the discharge throat will create a suction across the intake throat, thereby drawing more liquid into the impeller chamber, in order to compensate for the amount of gas therein. Such a condition is shown in Figure 5. The impeller 17 in this diagrammatic showing forces all of the liquid out of the discharge throats, such as the throats 44, 45 and 46, whereby the blade passing across the intake throats 40, 42 and 43 will create a suction therein sufficient to produce an influx or increase in the rate of flow of liquid into the impeller chamber through the intake port. This is due to the fact that the discharge of all of the liquid from between the blades or the major portion thereof out of the outlet ports 44, 45 and 46 will result in a starved condition of the impeller as it crosses the intake port, whereas if sufficient liquid were present within the impeller chamber so that a portion thereof would be carried over across the discharge port, such a starved condition would not occur.

Under such starved conditions, the inflow of gas to the impeller chamber is decreased, since the suction effect is decreased due to the fact that the discharge of liquid out of the discharge port is not as great as it should be, and no suction outwardly of the impeller blades is created by the displacement of this liquid. Also, the fact that none of the liquid is carried over from the discharge port across the intake port produces a suction effect at the intake port, due to the speed of the impeller blade, such as to, in effect, increase the normally low static pressure or difference in pressure between the liquid intake and the pressure within the impeller chamber, and consequently causes a greater inflow of liquid, thus compensating for the starved condition and producing the desired balanced condition.

Similarly, as shown in Figure 6, where a condition is attained wherein too much liquid is present for the amount of gas being absorbed, so that practically no absorption takes place, the gas absorption machine automatically balances itself again. When such condition occurs, the discharge ports 44, 45 and 46 are not sufficient to accommodate the discharge of all of the liquid carried between the respective impeller blades, and consequently a considerable portion of liquid is carried across the intake ports 40, 42 and 43. Due to the centrifugal force of this liquid, it forms a substantially solid layer over the intake ports as it is carried therepast by the impeller blade. Consequently there is no possibility of further liquid entering through the intake ports, since the centrifugal force of the liquid being carried therepast by the impeller blades is greater than the low static pressure of the intake liquid. A considerable portion of the superfluous liquid which has not been discharged through the discharge port may even be discharged against the head of liquid into the intake port, until such time as the impeller reaches a condition wherein the liquid between the blades has been passed out of the discharge ports to an extent such that the relatively deep solid layer thereof is not carried past the intake ports. As this condition is reached, no discharge occurs through the intake ports, and the back pressure is reduced, whereby the intake liquid may again reenter the impeller chamber for absorption with the gas being drawn thereinto.

As will be noted in Figure 6, a portion of the liquid between the impeller blades of the impeller 17 is discharged out of the intake ports 40 and 42, due to the fact that more than sufficient liquid is carried between the blade to be accommodated by the discharge ports 44, 45 and 46. As a result, this liquid is carried as a solid layer over the intake ports, and a portion thereof may be discharged outwardly through the intake ports, if the centrifugal force and weight thereof is greater than the low static pressure on the intake liquid. As a result, liquid is carried about the impeller chamber until such time that substantially a complete discharge is obtained into the discharge ports, and at the same time further liquid is prevented from entering through the intake ports. This automatically restores the absorption machine to a balanced condition, since it prevents the further entrance of additional intake liquid until sufficient liquid has been discharged to provide the balanced condition.

As shown in Figure 7, I have diagrammatically illustrated the absorption principle upon which the present machine operates as embodied in a single throat absorption device. The intake throat of this unit is indicated at 70, with the discharge throat being indicated at 72. As the impeller sweeps past the intake port, during the balanced operation of the machine, it strikes the liquid entering from this port into the impeller chamber 73, breaking it up and subdividing it into an infinite number of minute particles, as generally illustrated by the numeral 74. This intimate mixture of gas particles and liquid particles between the respective impeller blades is then moved in a circular direction about the impeller chamber, at the same time having some radial movement due to the centrifugal force thereof. Thus, as shown at 75, the liquid has started to recombine, producing a continual change in a large reacting surface for interface contact with the gas particles to produce the maximum rate of absorption between the gas and liquid. As shown at 76, striation has commenced, the liquid beginning to form an annular layer about the inner periphery of the impeller chamber, and the individual liquid particles tending to be thrown more and more to the outer tip end of the impeller blade. As shown at 77, the liquid has been substantially compressed about the gas particles, tending to place the particles under pressure, at the same time causing further diffusion of the gas through the liquid, and also discharging from the main body of liquid the unabsorbed gas bubbles, due to the greater density of the liquid. Thus, the liquid which eventually is discharged through the ports 72 comprises substantially a completely absorbed gas carried by the liquid, since the unabsorbed gas particles have been squeezed therefrom, and the absorbed gas particles are therefore carried by this liquid out of discharge ports 72.

It is thus believed apparent that I have provided a structure wherein the particular type of apparatus employed is capable of providing the most efficient absorption of gas and liquid while maintaining the ratio of gas to liquid substantially balanced at all times.

The invention is capable of considerable modification in certain details of construction and design, and it is apparent that the underlying principles of mechanical acceleration of the rate of absorption, plus the provision of a structure wherein automatic balancing is attained at all times, can be embodied in various modified types of structures. I do not intend, therefore, to be limited to the exact type of unit herein shown and described, but only insofar as defined by the scope and spirit of the appended claims.

I claim:

1. The method of absorbing gas into a liquid within an impeller chamber having a rotatable impeller therein which comprises passing liquid against a body of rotating gas and liquid in said chamber from the annular periphery thereof in a direction opposite to the direction of rotation of said body, drawing gas into said chamber substantially centrally thereof, breaking said liquid into an infinite number of minute globules sprayed into intimate contact with the gas within said chamber, recombining said globules of liquid within said chamber with absorbed gas therein adjacent the annular perpihery thereof by centrifugal pressure to separate the gas-saturated liquid from the unabsorbed gas, and discharging said gas-saturated liquid outwardly from said chamber just prior to introduction of saturated liquid into said body.

2. The method of absorbing gas into a liquid within an impeller chamber having a rotatable impeller therein which comprises passing liquid into a body of rotating gas in said chamber from the annular periphery thereof in a direction opposed to the direction of rotation of said body, drawing gas into said chamber substantially centrally thereof, breaking said liquid into an infinite number of minute globules sprayed into intimate contact with the gas within said chamber, recombining said globules of liquid within said chamber with absorbed gas therein by centrifugal pressure whereby the gas-saturated liquid is forced through the body of gas to the annular periphery of said chamber, discharging said gas-saturated liquid outwardly from said chamber, and automatically varying the ratio of gas and liquid within said chamber in accordance with the rate of absorption of said gas into said liquid.

3. A method of absorbing gas into a liquid which comprises breaking up a stream of said liquid into a minute spray, introducing gas into said spray, rotating said spray and gas at relatively high speed in a confined area to produce a constantly changing reacting surface, agglomerating the saturated liquid by centrifugal pressure to discharge the same from said confined area under pressure, and varying the amount of liquid broken up within said confined area in accordance with the rate of absorption of said gas into said liquid.

4. In a gas absorption machine, a casing comprising an impeller chamber, an impeller mounted for rotation therein, a discharge manifold, an intake manifold, and a plurality of pairs of ports spaced about the periphery of said impeller chamber, like ones of said pairs being connected respectively to each of said manifolds, and a gas inlet extending substantially centrally into said impeller chamber.

5. In a gas absorption machine, a casing comprising an impeller chamber, an impeller mounted for rotation therein, a discharge manifold, an intake manifold, and a plurality of pairs of substantially tangential ports spaced about the periphery of said impeller chamber, like ones of said pairs being connected respectively to each of said manifolds, and a gas inlet extending substantially centrally into said impeller chamber.

6. In a gas absorption machine, the combination of a casing containing a channel for an impeller, an impeller mounted to run in said channel, a plurality of substantially tangential outlets from said channel, an intake manifold connecting alternate ones of said outlets, a discharge manifold connecting the other of said outlets, and a gas intake port communicating with the center of said impeller channel.

7. A gas absorption machine comprising an impeller chamber, an impeller mounted for rotation therein, an annular intake manifold at one side of said chamber communicating with said chamber through the annular periphery thereof, an annular discharge manifold at the opposite side of said chamber and communicating with said chamber through the annular periphery thereof, and a gas intake port extending axially into the center of said impeller chamber.

8. In a gas absorption machine, a casing having a circular runner channel, an open runner fitting in said channel, a gas inlet leading to the center of said runner, and a plurality of pairs of adjacent tangential throats in the periphery of said channel, one throat of each pair of throats being connected to an absorbing liquid intake manifold, the other throat of each pair of throats being connected to a discharge manifold.

9. In a gas absorption machine, a casing having a circular impeller channel, an impeller mounted for rotation in said channel, a plurality of pairs of throats in the annular periphery of said channel, the anterior one of each pair of throats being connected to a common discharge manifold, the posterior one of each pair of throats being connected to a common liquid intake manifold, and a gas inlet passageway opening into the center of said impeller chamber.

10. In a gas absorption machine, a casing having a circular impeller chamber, an impeller mounted for rotation in said chamber, substantially annular manifolds about the periphery of said chamber and at opposite sides thereof, a plurality of tangential throats leading from the periphery of said chamber to said manifolds, said throats being arranged in pairs with the same relative throat of each pair of throats being connected to the same manifold, and a gas inlet disposed substantially centrally of said chamber.

11. In a gas absorption machine, a casing having a circular impeller chamber, an impeller mounted for rotation therein, substantially annular manifolds about the periphery of said chamber and at opposite sides thereof, one of said manifolds being connected to an intake port formed integral with said casing, the other of said manifolds being connected to a discharge port, a pair of throats extending substantially tangentially outwardly of the periphery of said chamber, the anterior throat being connected to said discharge manifold and the posterior throat being connected to said intake manifold, and means for introducing gas into said impeller chamber.

12. In a gas absorption machine, a casing having a circular impeller chamber, an impeller mounted for rotation in said chamber, substantially annular manifolds about the periphery of said chamber and at opposite sides thereof, and a plurality of tangential throats leading from the periphery of said chamber to said manifolds, said throats being arranged in pairs with the same relative throat of each pair of throats being connected to the same manifold, said manifolds having communication only through said throats.

13. A gas absorption machine having a circular impeller chamber, an impeller mounted for rotation therein, a pair of substantially annular separated manifolds on opposite sides of said chamber about the periphery thereof, means opening into the periphery of said chamber and providing communication between said manifolds, and means for introducing gas into said chamber.

14. A gas absorption machine comprising a casing having a circular impeller chamber, an impeller mounted for rotation therein, means for introducing absorbing liquid into said chamber in a direction opposite to the direction of rotation of said impeller to break said liquid into a plurality of minute liquid particles, means for introducing gas into said chamber, and discharge means leading from said chamber and disposed away from said liquid introducing means a sufficient distance to provide intimate interface contact of gas and liquid and agglomeration of a substantial portion of liquid particles prior to discharge of said liquid therethrough.

15. A gas absorption machine comprising a casing having a circular impeller chamber therein, an impeller mounted for rotation in said chamber, discharge ports in the periphery of said casing extending substantially tangentially outwardly therefrom in the direction of rotation of said impeller, corresponding intake ports adjacent to and posterior to said discharge ports for introducing liquid against the rotation of said impeller, annular manifolds common to said discharge ports and to said intake ports, and means for introducing gas substantially axially from said intake manifold into said chamber.

16. A gas absorption machine comprising a casing having a circular impeller chamber therein, an impeller mounted for rotation in said chamber, means for introducing gas into said chamber, means for introducing liquid into said chamber, said impeller providing for intimate contact between said gas and minute particles of said liquid, and means providing for discharge of said liquid under pressure tangentially outwardly from said chamber.

17. In a gas absorption machine, an impeller chamber having an impeller mounted for rotation therein, means for introducing liquid at a plurality of points into said chamber, means for introducing gas into said chamber at the center thereof, said impeller breaking said liquid into a plurality of fine particles for intimate contact with said gas, and means providing for discharge of liquid from said chamber under pressure subsequent to said liquid-gas contact and after agglomeration of said liquid particles has commenced.

18. A gas absorption machine comprising a mixing chamber, means for introducing gas into said chamber, means for introducing absorbing liquid tangentially into said chamber, means in said chamber rotating in a direction opposite to the direction of introduction of said liquid for producing intimate and constantly changing gas and liquid contact within said chamber, and means disposed anterior to said liquid introducing means providing for discharge of introduced liquid prior to introduction of additional liquid, the discharge and introduction means being proportioned to maintain substantially balanced flow into and out of said chamber in accordance with the rate of absorption of said gas into said liquid.

19. The method of absorbing a gas into a liquid wherein the liquid and gas are supplied to an absorbing chamber under substantially constant heads, which comprises introducing the liquid at a plurality of spaced points against a rotating body of gas and liquid, breaking the introduced liquid into a plurality of minute particles distributed throughout the rotating body, forcing the liquid toward the most rapidly moving portion of said body and simultaneously displacing unabsorbed gas from between said particles as they agglomerate, and discharging the gas-saturated liquid outwardly from said body just anterior to the point of introduction of unsaturated liquid.

20. The method of absorbing a gas into a liquid wherein the liquid and gas are supplied to an absorbing chamber under substantially constant heads, which comprises introducing the liquid at a plurality of spaced points against a rotating body of gas and liquid, breaking the introduced liquid into a plurality of minute particles distributed throughout the rotating body, forcing the liquid toward the most rapidly moving portion of the body and simultaneously displacing unabsorbed gas from between the particles as they agglomerate, discharging the gas-saturated liquid outwardly from the body anterior to the point of introduction of unsaturated liquid, and blocking off the introduction of unsaturated liquid against the rotating body when the absorption of gas falls below the maximum absorption point.

21. The method of absorbing a gas into a liquid wherein the liquid and gas are supplied to an absorbing chamber under substantially constant heads, which comprises introducing the liquid at a plurality of spaced points against a rotating body of gas and liquid in said chamber, breaking the introduced liquid into a plurality of minute particles distributed throughout said rotating body, forcing the liquid toward the most rapidly moving portion of the rotating body and simultaneously displacing unabsorbed gas from between the particles as they agglomerate in said rapidly moving portion, discharging the gas-saturated liquid outwardly from the body anterior to the point of introduction of unsaturated liquid, and creating a suction at the liquid introduction points to increase the quantity of liquid introduced against said rotating body when a liquid-starved condition exists.

22. In a gas absorption machine having a casing provided with an axial gas inlet connection, a liquid inlet connection, and a discharge connection having a single outlet, an impeller having vanes extending from substantially the axial inlet connection to the periphery thereof, said casing having a channel, the periphery of which has a plurality of substantially equally spaced tangential outlet ports and substantially concentric portions between said outlet ports of substantially the same radius as said impeller, said channel also having similar liquid inlet ports disposed immediately posterior to each of said outlet ports whereby the gas and liquid mixture carried by the impeller through the angular distance subtended by each concentric portion between one of said inlet ports and the next adjacent discharge port is moved substantially angularly only to acquire centrifugal force and to eliminate unabsorbed gas from said mixture in advance of said gas-saturated liquid being discharged radially into the succeeding discharge port.

23. The combination of claim 22 wherein the discharge ports are separated by spiral walls defining between them outwardly tapering discharge passageways, all of which merge into the single discharge outlet.

24. The combination of claim 22 wherein the inlet ports are separated by spiral walls defining between them inwardly tapering inlet passageways, all of which emerge from said single liquid inlet connection.

25. The method of absorbing gas efficiently into a liquid in a gas absorption machine, which comprises dividing the mixture of gas and liquid into definite portions within the machine, moving each portion angularly through a fractional part of a complete rotation to attain discharge velocity and to separate the unabsorbed gas from the gas-saturated liquid, and discharging each portion of gas saturated liquid tangentially through a discharge throat as soon as it has attained its discharge velocity.

26. The method of claim 25 with the steps of introducing into and breaking up unsaturated liquid in each of said definite portions at the initiation of said angular movement, and decreasing the cross-section of gas-saturated liquid during said angular movement to increase the pressure therein for increasing absorption and driving out of said liquid unsaturated gas particles prior to discharge of said gas-saturated liquid.

HARRY E. LA BOUR.